US012741582B2

(12) United States Patent
Rutman et al.

(10) Patent No.: US 12,741,582 B2
(45) Date of Patent: Sep. 22, 2026

(54) BASE PLATE LOCKING SYSTEM

(71) Applicant: Ford Global Technologies, LLC, Dearborn, MI (US)

(72) Inventors: Matthew B. Rutman, Westland, MI (US); Eric Scott Levine, Novi, MI (US); Daniel Ritz, Windsor (CA); Stuart C. Salter, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 613 days.

(21) Appl. No.: 18/205,629

(22) Filed: Jun. 5, 2023

(65) Prior Publication Data

US 2024/0399950 A1 Dec. 5, 2024

(51) Int. Cl.

| | |
|---|---|
| ***B60P 7/08*** | (2006.01) |
| ***B60P 7/10*** | (2006.01) |
| ***B60R 9/06*** | (2006.01) |
| ***B60R 11/06*** | (2006.01) |

(52) U.S. Cl.

CPC ............... *B60P 7/0807* (2013.01); *B60P 7/10* (2013.01); *B60R 9/06* (2013.01); *B60R 11/06* (2013.01)

(58) Field of Classification Search

CPC ......... B60P 7/0807; B60P 7/10; B60P 7/0815; B60R 9/06; B60R 11/06; B62D 33/0207; A47B 57/487; A47B 47/50; A47B 87/0207; A47B 87/0276

USPC .................. 296/187.01, 180–189, 100–199; 224/400–409

See application file for complete search history.

(56) References Cited

U.S. PATENT DOCUMENTS 5,588,631 A * 12/1996 Yee ......................... B60R 11/06 224/547
5,976,672 A * 11/1999 Hodgetts ................. B60R 13/01 428/116
6,502,868 B1 1/2003 Laspa et al.
9,901,170 B2 2/2018 Tam
10,583,962 B2 3/2020 Brunner et al.
10,598,875 B2 3/2020 Quintus
10,703,534 B2 7/2020 Brunner et al.

(Continued)

OTHER PUBLICATIONS

US 10,947,009 B2, 03/2021, Brunner et al. (withdrawn)

(Continued)

*Primary Examiner* — Amy R Weisberg
*Assistant Examiner* — Philip C Adams
(74) *Attorney, Agent, or Firm* — Vichit Chea; Carlson, Gaskey & Olds, P.C.

(57) ABSTRACT

An accessory attachment system includes a base plate configured to be positioned within a vehicle cargo area that has a floor surface and at least one side wall extending upwardly relative to the floor surface. The base plate includes at least a first plate portion that is associated with the at least one side wall and a second plate portion that extends above the floor surface. An accessory comprises at least one accessory side wall including at least one first lock feature associated with the first plate portion, and a bottom wall including at least one second lock feature associated with the second plate portion. The accessory includes at least one handle that is movable between a locked position and an unlocked position, and wherein the at least one handle simultaneously unlocks the first lock feature and the second lock feature when moved to the unlocked position.

27 Claims, 11 Drawing Sheets

(56) References Cited

U.S. PATENT DOCUMENTS

D895,966 S 9/2020 Brunner et al.
D895,967 S 9/2020 Brunner et al.
D896,517 S 9/2020 Brunner et al.
D896,518 S 9/2020 Brunner et al.
D897,103 S 9/2020 Brunner et al.
10,780,836 B1 * 9/2020 Fisher ....................... B60R 9/02
D898,320 S 10/2020 Brunner et al.
10,962,218 B2 3/2021 Plato et al.
10,981,696 B2 4/2021 Brunner et al.
D917,977 S 5/2021 Brunner et al.
D918,584 S 5/2021 Brunner et al.
D919,296 S 5/2021 Brunner et al.
11,008,136 B2 5/2021 Brunner et al.
D920,671 S 6/2021 Brunner et al.
11,027,883 B1 6/2021 Brunner et al.
D923,935 S 7/2021 Brunner et al.
11,192,690 B1 12/2021 Brunner et al.
11,268,691 B2 3/2022 Plato et al.
11,279,421 B1 * 3/2022 Hoogendoorn ........... B60R 9/06
11,365,026 B2 6/2022 Brunner et al.
11,426,859 B2 * 8/2022 Squiers .................. B25H 3/022
11,427,382 B2 8/2022 Brunner et al.
11,465,805 B2 10/2022 Brunner et al.
11,560,909 B2 * 1/2023 Gardner .................. B60R 11/00
2009/0200351 A1 8/2009 Brallier et al.
2011/0140462 A1 6/2011 Lin et al.
2017/0015254 A1 1/2017 Wilson
2017/0254118 A1 9/2017 Winkler
2018/0194294 A1 7/2018 Richter
2019/0211584 A1 7/2019 Francesca
2019/0375352 A1 * 12/2019 Furuya ...................... H02J 7/00

OTHER PUBLICATIONS

Understanding LED Lock Indicator and Two-Stage Unlock | How-To | Lincoln; youtube.com video; youtube.com/watch?v=Cby4GoihGwE; Lincoln; accessed Dec. 17, 2025; published Jan. 6, 2018. (Year: 2018).*

* cited by examiner 32a
86
36b
88
94
122
120
96
200
108
106
106
100

BASE PLATE LOCKING SYSTEM

TECHNICAL FIELD

This disclosure relates generally to an attachment and locking system and, more particularly, to an attachment and locking system that uses one actuator to unlock at least two locking connections to a base plate.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment system, including: a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface; an accessory comprising at least one accessory side wall including at least one first lock feature associated with the first plate portion, and a bottom wall including at least one second lock feature associated with the second plate portion; and wherein the accessory includes at least one handle that is movable between a locked position and an unlocked position, and wherein the at least one handle simultaneously unlocks the at least one first lock feature and the at least one second lock feature when moved to the unlocked position.

In some aspects, the techniques described herein relate to an accessory attachment system with at least one first aperture provided in the first plate portion and at least one second aperture provided in the second plate portion, and wherein the at least one first lock feature is received within the at least one first aperture when in the locked position and wherein the at least one second lock feature is received within the at least one second aperture when in the locked position.

In some aspects, the techniques described herein relate to an accessory attachment system, wherein the at least one first lock feature comprises a first latch pin that is coupled to the at least one handle via an actuating mechanism and the at least one second lock feature comprises a second latch pin that is fixed to the at least one handle.

In some aspects, the techniques described herein relate to an accessory attachment system, wherein the actuating mechanism comprises a strap that is slidable along a track to retract the first latch pin from the at least one first aperture when the at least one handle is moved to the unlocked position.

In some aspects, the techniques described herein relate to an accessory attachment system, wherein the at least one handle extends from a grip portion to a distal end, and wherein the second latch pin is attached to the distal end of the at least one handle, and wherein the second latch pin is moved upwardly and out of the at least one second aperture when the at least one handle is moved to the unlocked position.

In some aspects, the techniques described herein relate to an accessory attachment system, wherein the at least one accessory side wall comprises a rear wall and wherein the accessory further includes a pair of side walls that extend upwardly from the bottom wall and which connect the rear wall to a front wall, and wherein the at least one handle is supported by one side wall of the pair of side walls for sliding movement between the locked position and the unlocked position.

In some aspects, the techniques described herein relate to an accessory attachment system having at least one light feature associated with one of the front wall, rear wall, and pair of side walls to indicate an accessory characteristic.

In some aspects, the techniques described herein relate to an accessory attachment system, wherein the at least one light feature is associated with the one side wall, and the accessory characteristic is a locking state indicator, and wherein when the at least one handle is moved to the unlocked position, the at least one handle overlaps the at least one light feature indicating a change in a locking state.

In some aspects, the techniques described herein relate to an accessory attachment system, wherein the at least one first lock feature comprises a latch pin and a strap assembly, wherein the latch pin is insertable into a latching aperture in the first plate portion, and wherein the strap assembly couples the latch pin to the at least one handle such that movement of the at least one handle is translated into movement of the latch pin.

In some aspects, the techniques described herein relate to an accessory attachment system, wherein the strap assembly includes a strap, a disk having at least a first pin, and a plate with a second pin, wherein the plate is fixed to a first end of the strap and the first pin is in engagement with the latch pin, and wherein the second pin is received within an aperture in the disk, and when the at least one handle is moved to the unlocked position, the strap rotates the disk via the second pin, which in turn retracts the latch pin from the latching aperture via the first pin.

In some aspects, the techniques described herein relate to an accessory attachment system, wherein the strap includes a second end that is fixed to the at least one handle via at least one mounting bracket.

In some aspects, the techniques described herein relate to an accessory attachment system, including: a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface; wherein the first plate portion and the second plate portion include a plurality of apertures, wherein at least one of the plurality of apertures comprises a first latching aperture located in the first plate portion and at least another of the plurality of apertures comprises a second latching aperture located in the second plate portion; an accessory comprising at least one accessory side wall including at least one first lock feature associated with the first latching aperture and a bottom wall including at least one second lock feature associated with the second latching aperture; and wherein the accessory includes at least one handle that is movable between a locked position and an unlocked position, and wherein the at least one handle simultaneously unlocks the at least one first lock feature and the at least one second lock feature when moved to the unlocked position.

In some aspects, the techniques described herein relate to an accessory attachment system, wherein the at least one accessory side wall includes at least one cleat and the plurality of apertures includes at least one cleat aperture that receives the at least one cleat to attach the accessory to the first plate portion, and wherein the at least one cleat aperture is distanced from the first latching aperture.

In some aspects, the techniques described herein relate to an accessory attachment system, wherein the at least one first lock feature comprises a first latch pin that is coupled to the at least one handle via an actuating mechanism and the at least one second lock feature comprises a second latch pin that is attached to the at least one handle.

In some aspects, the techniques described herein relate to an accessory attachment system, wherein the actuating mechanism comprises a strap assembly that couples the first latch pin to the at least one handle such that movement of the at least one handle is translated into movement of the first latch pin, and wherein the strap assembly includes a strap, a disk having a first pin, and a plate having a second pin, wherein the plate is fixed to a first end of the strap and the first pin is in engagement with the first latch pin, and wherein the second pin is received within an aperture in the disk, and when the at least one handle is moved to the unlocked position, the strap rotates the disk via the second pin, which in turn retracts the first latch pin from the first latching aperture via the first pin.

In some aspects, the techniques described herein relate to an accessory attachment system, wherein the at least one handle extends from a grip portion to a distal end, and wherein the second latch pin is attached to the distal end of the at least one handle, and wherein the second latch pin is moved upwardly and out of the second latching aperture when the at least one handle is moved to the unlocked position.

In some aspects, the techniques described herein relate to an accessory attachment system, wherein the at least one accessory side wall comprises a rear wall and wherein the accessory further includes a pair of side walls that extend upwardly from the bottom wall and which connect the rear wall to a front wall, and wherein the at least one handle is supported by one side wall of the pair of side walls for sliding movement between the locked position and the unlocked position, and including at least one light feature that is associated with the one side wall of the pair of side walls, and wherein when the at least one handle is moved to the unlocked position, the at least one handle overlaps the at least one light feature indicating a change in a locking status.

In some aspects, the techniques described herein relate to a method of attaching an accessory to a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface, and wherein the accessory includes at least a first lock feature and a second lock feature, the method including: simultaneously unlocking the first lock feature from the first plate portion and the second lock feature from the second plate portion when at least one handle associated with the accessory is moved to an unlocked position.

In some aspects, the techniques described herein relate to a method, wherein the first lock feature comprises a first latch pin and the second lock feature comprises a second latch pin, the method including providing at least one first latching aperture in the first plate portion to receive the first latch pin and at least one second latching aperture in the second plate portion to receive the second latch pin, coupling the first latch pin to the at least one handle via a strap assembly, fixing the second latch pin to a bottom end of the at least one handle, and simultaneously pulling the first latch pin out of the at least one first latching aperture via the strap assembly and pulling the second latch pin out of the at least one second latching aperture via the at least one handle.

In some aspects, the techniques described herein relate to a method, the method including using a light feature associated with the accessory to indicate a change in locking status of the accessory.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate accessory attachment and locking system for a vehicle or stationary application. The system includes a base plate that provides an attachment interface for securing the accessories in place to a bottom wall or side walls of a cargo area. The disclosure also provides for a locking/unlocking system such that the accessories can be secured to the base plate. Various types of accessories can be secured to the vehicle through the attachment interface provided by the base plate. The number and positions of base plates can be adjusted for particular vehicles or particular needs.

There are often situations where it would be useful for the vehicle owner to be able to switch between accessories to enable different functional capabilities, or to temporarily remove an accessory or module to allow the module or its contents to be used off the vehicle, then reattach the module once the desired operation or task is completed. The subject disclosure provides an integration method that allows a mechanical attachment to the vehicle via a quick connect/disconnect capability, while also providing a locking system to make sure that the accessories are securely held in place.

Figure 1A:
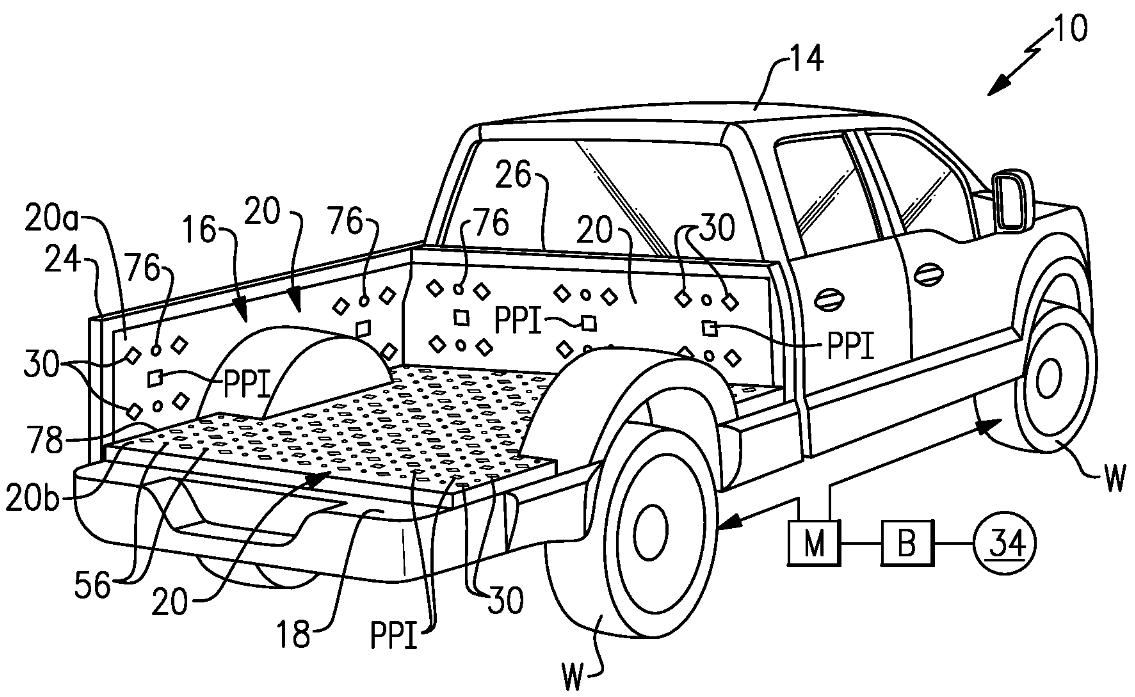
FIG. 1A illustrates a perspective view of a vehicle having a cargo bed equipped with base plates that can be used to secure an accessory according to an exemplary aspect of the present disclosure.
Figure 1B:
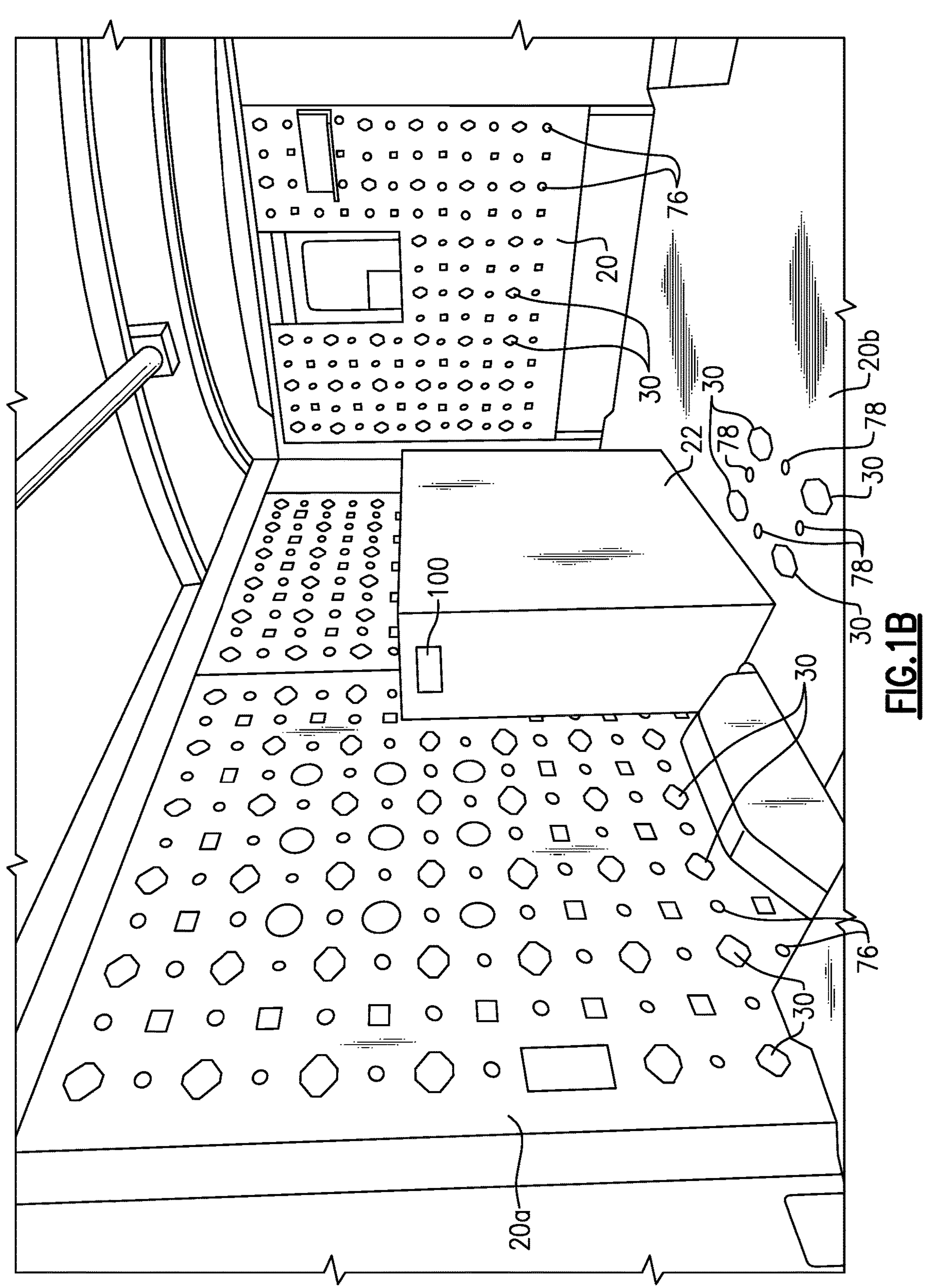
FIG. 1B illustrates a perspective view of a van having a cargo area equipped with base plates that can be used to secure accessories according to an exemplary aspect of the present disclosure.
Figure 2:
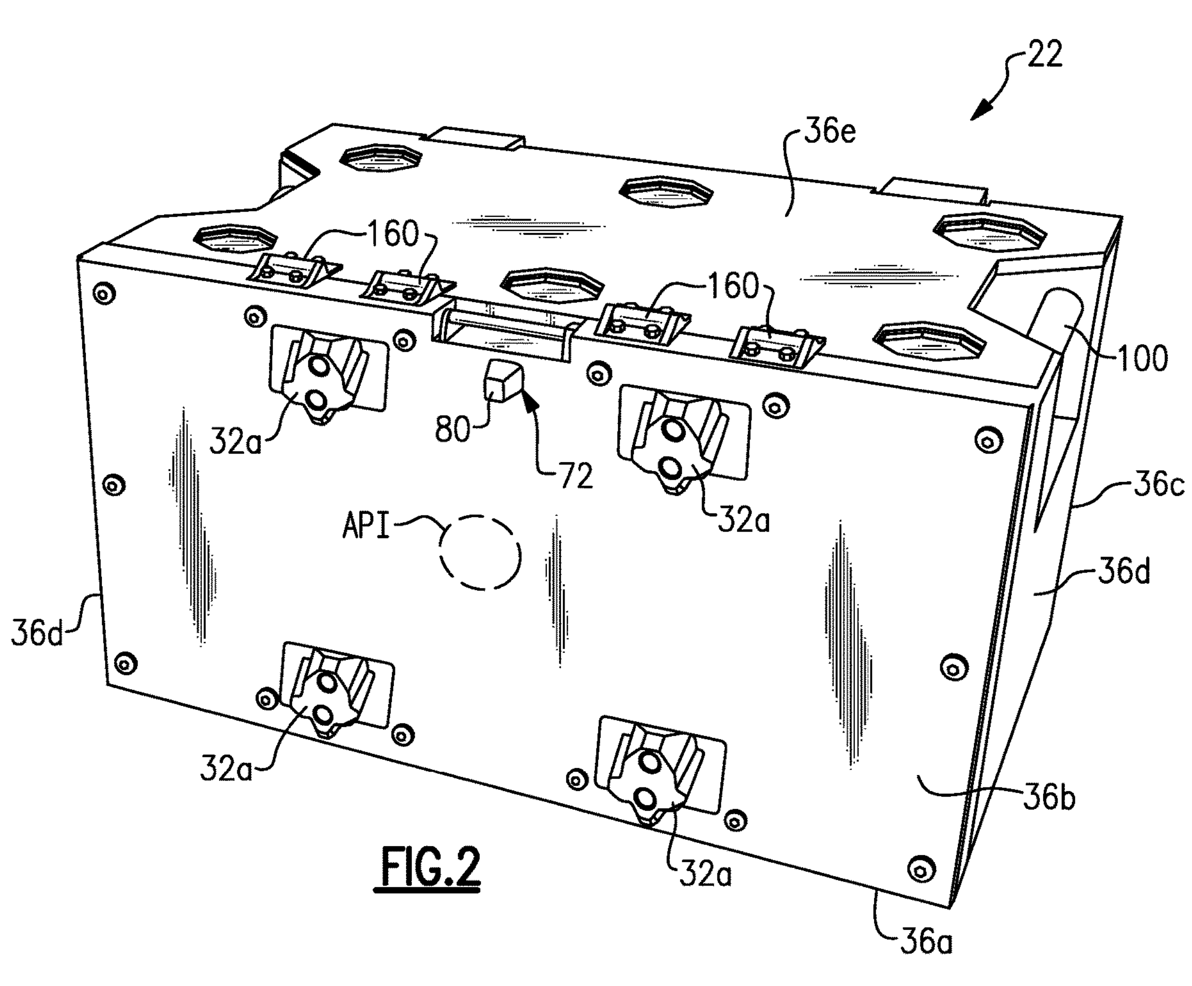
FIG. 2 illustrates an accessory box with a plurality of mounting feet/cleats on a rear wall of the accessory box.

The figures disclose exemplary embodiments of the accessory attachment and locking system that interfaces with a base plate. With reference to FIGS. 1A-B and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates the accessory attachment and locking system.

In one example, the vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle. In another example, the vehicle could have any other type of propulsion system such as an internal combustion engine or alternative fuel based propulsion system, for example.

In particular, for an electrified vehicle application, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

In the exemplary embodiment, a plurality of base plates 20 are used to support one or more accessories and/or modules 22. In one example, the cargo bed 16 is defined by a pair of side walls 24 (only one is shown for purposes of clarity), a rear wall 26, and a tailgate (not shown). In one example, the base plates 20 are secured directly to walls 24, 26 and/or to the floor 18 of the cargo bed 16 by fastening, welding, etc., at a first connection interface. In another example, the base plates 20 can be supported for sliding movement within the cargo bed 16 above the floor on rails or other types of sliding structures. The accessories and/or modules 22 can be secured to the vehicle 10 by engaging one or more of the base plates 20 via a second connection interface. The accessories/modules 22 can include a lockable storage box that holds tools, a container, a refrigerator, etc. For example, the accessory 22 could be a lidded lockable container that includes a compartment for storing power tools or other items that require power or data connection.

As shown in FIGS. 1A-1B, the base plates 20 include a plurality of apertures 30. As shown in FIG. 2, an example accessory 22 comprises a lockable container or box 22 that includes one or more cleats or mounting feet 32*a*. The box 22 can engage the base plate 20 using an attachment system comprising the plurality of apertures 30 and the mounting feet 32*a* that cooperate to provide a mechanical connection interface. In this example, the base plates 20 provide the apertures 30 and the accessories 22 include the feet 32*a*. This could be rearranged, however, such that one or all of the feet 32*a* extend from the base plates 20 and the accessories 22 provide some or all of the apertures 30. The apertures 30 are spaced upwardly from the floor 18 or side wall 24, 26 by an open gap such that the feet 32*a* from the accessory 22 can be easily inserted into the base plate 20 to attach the accessory 22 to the base plate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory 22 having specialized tools for the second type of job.

As discussed above, in this example, the accessory 22 comprises a lockable box that is mechanically coupled to the vehicle 10 via the base plate 20. The accessory 22 could additionally include a power connection interface 34 that would be able to supply power to the box itself as well as any tools/devices within the box that would require charging. The power connection interface 34 is powered from the vehicle power supply, such as the battery pack B, for example. Any devices within the lockable box, e.g. rechargeable tools, could be recharged when set within the box and coupled to a charging interface associated with the power connection interface 34 between the accessory 22 and the base plate 20.

In one example, the base plate 20 can also be plugged into either 12V vehicle power or other power sources via a variety of connections/outlets. These power sources supply power to charge or power the accessories 22 via the power supply connection interface 34 associated with the base plate 20. Each accessory 22 has an accessory power interface (API) as shown in FIG. 2. At least some, or all, of the mounting locations for an accessory 22 have a charging interface with a plate power interface (PPI) as shown in FIGS. 1A-1B. The API and the PPI can be a direct electrical connection or can be via an inductive wireless charging connection. The PPI receive vehicle power via the vehicle power supply or other power source.

The subject disclosure provides for a side and rear mounted attachment interface between the accessory box 22 and the base plate 20. In this example, the base plate 20 is configured to be positioned within the vehicle cargo bed 16 and has a first plate portion 20*a* at the side wall 24 that extends upwardly from the floor surface in a vertical direction and a second plate portion 20*b* that extends in a lateral direction out over the floor surface. The apertures 30 are located on the first plate portion 20*a* and the second plate portion 20*b* of the base plate 20.

The accessory box 22 includes a plurality of walls including a bottom wall 36*a*, a rear wall 36*b*, a front wall 36*c*, and a pair of side walls 36*d* extending to connect the rear wall 36*b* to the front wall 36*c*. The accessory box 22 may also include a top wall or pivotable lid 36*e* that encloses an open internal cavity within the box 22. In one example, at least one of the walls includes a handle 100. In one example, each side wall 36*d* includes a handle 100. The subject disclosure provides for at least one handle 100 that is mounted for sliding movement relative to the side wall 36*d*, and which is associated with a locking system 52 (FIG. 4) such that the handle 100 is moveable between a locked position and an unlocked position to control locking/unlocking of the accessory box 22 from the first 20*a* and second 20*b* plate portions.

Figure 3:
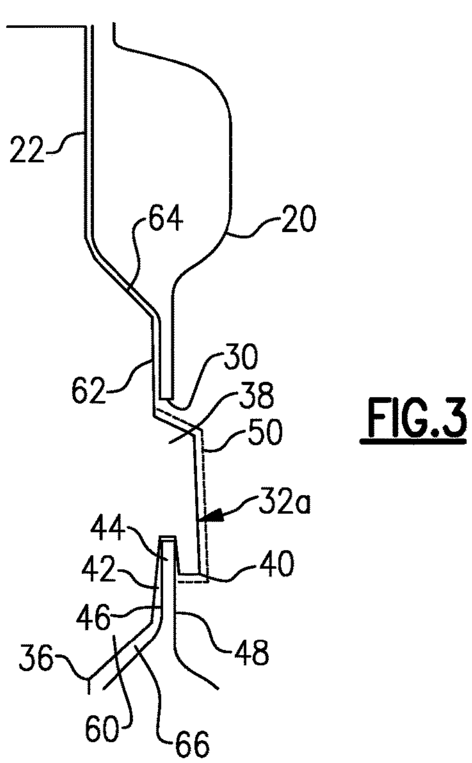
FIG. 3 is a section view of a mounting foot/cleat installed within an aperture of a base plate in a side mounted configuration.

In one example, the accessory box 22 includes cleats or mounting feet 32*a* on the rear wall 36*b* to connect to mounting apertures 30 in the first plate portion 20*a* and cleats or mounting feet 32*b* on the bottom wall 36*a* to connect to the mounting apertures 30 in the second plate portion 20*b*. In one example, each mounting foot 32*a* on the rear wall 36*b* has a predefined shape that is configured to pull the accessory box 22 against the outer surface of the first plate portion 20*a* as the mounting foot 32*a* is inserted into the aperture 30 and moved vertically to a mounted position as shown in FIG. 3. Each mounting foot 32*a* comprises a base body 38 that extends to a distal end 40 that is spaced from the accessory rear wall 36*b* by a gap 42 that receives an edge portion 44 of a corresponding aperture 30 to attach the box 22 to the first plate portion 20*a*. In one example, the distal end 40 extends downwardly from the base body 38 in the vertical direction to form the predefined shape as a lip or hook. In one example, the gap 42 decreases in size in a direction away from the distal end 40 and toward the base body 38 such that the gap 42 is narrower at the base body 38 than at the distal end 40. In one example, each foot 32*a* is tapered such that the distal end 40 is narrower than the base body 38. This tapered configuration continues to force the feet 32*a* into the mating surfaces surrounding the aperture 30 under various dimensional and wear conditions, which further reduces any loose conditions that would allow rattling of the accessory/module 22.

In one example, each foot 32*a* is formed to extend outwardly from a boss portion 60 that extends outwardly from the outer surface of the side wall of the box 22 as best shown in FIG. 3. The boss portion 60 has a flat center portion 62 with a tapered wall 64 that increases in an outer dimension in a direction extending away from the center portion 62 and toward the outer surface of the side wall of the box 22. The base plate 20 has a corresponding recess 66 on the first surface 46 that has the same shape as the boss portion 60. This further facilitates a snug and secure fit of the box 22 to the base plate 20.

One example side attachment method includes aligning the cleats or mounting feet 32*a* of the box 22 to mounting apertures 30 on the side wall 24, 26 base plate portion. The distal ends 40 of the feet 32*a* are moved in a lateral direction, transverse to the vertical direction, to begin to enter the apertures 30. The distal ends 40 extend through a thickness of the plate portion 20*a* at the aperture location from a first surface 46 of the base plate 20 to an opposite, second surface 48 of the base plate 20. Once the distal ends 40 have entered through the apertures 30 and have moved pass the second surface 48 of the base plate, the box 22 then moves downward in the vertical direction.

As the box 22 moves downward, the shape of the feet 32*a* pulls the box 22 snug against the first surface 46 of the base plate 20. This is due to the decreasing size of the gap 42. The edge portion 44 of the first plate portion 20*a* fits tightly within the narrowest part of the gap 42 when in the mounted position to securely hold the box in place. This interference fit between the foot 32*a* and first plate portion 20*a* helps to prevent rattling. In one example, each cleat or foot 32*a* may include an additional layer 50 such that the feet 32*a* are covered in a plastic or similar material. In one example, the feet 32*a* are overmolded with plastic to act like a gasket to further prevent rattling. This provides a simplified side mount foot attachment interface that does not include moving parts within the foot itself resulting in a more economical and robust design.

Figure 4:
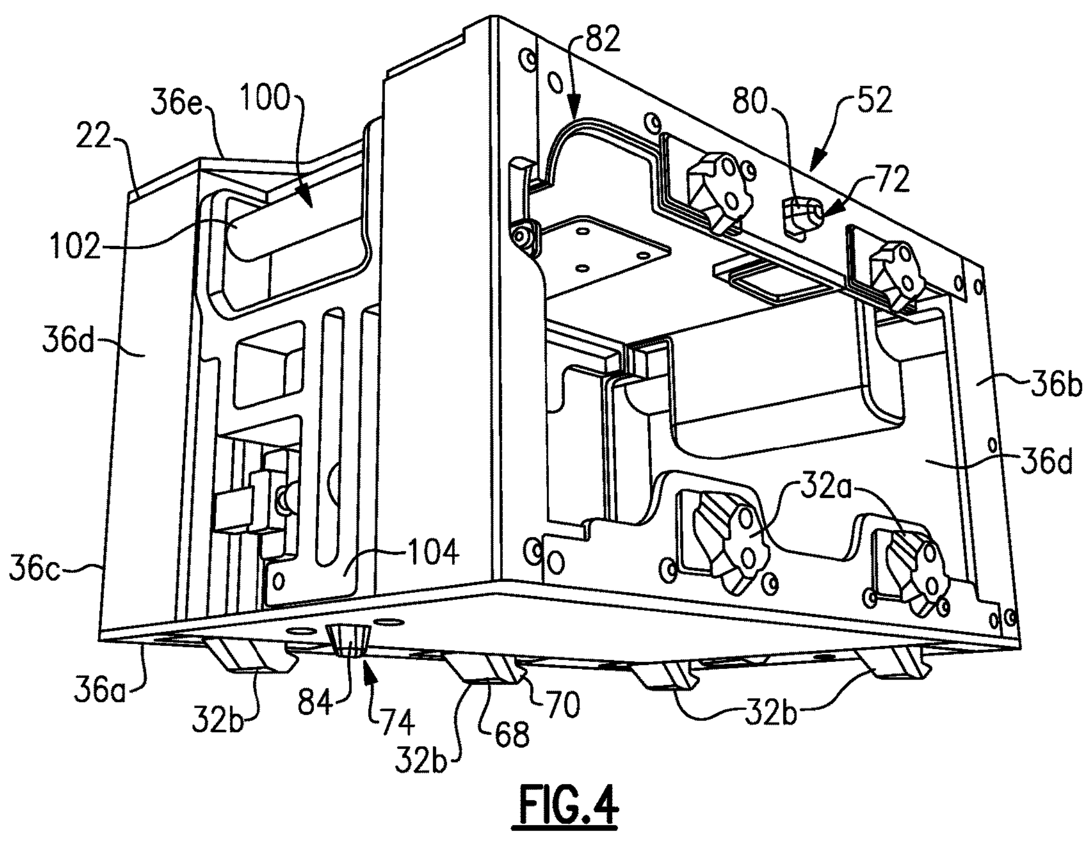
FIG. 4 is a side perspective view of an accessory with a locking system that includes a first latch pin to secure the accessory to a side base plate and a second latch pin to secure the accessory to a bottom base plate.

In one example, as shown in FIG. 4, each mount foot 32*b* on the bottom wall 36*a* comprises a base body 68 that extends to a distal end 70. In one example, the distal end 70 forms a hook or ledge portion that sticks outwardly of one side of the associated foot 32*b*. The feet 32*b* are inserted in a vertical direction through apertures 30 in the second plate portion 20*b* to attach the box 22 to the second plate portion 20*b*.

In one example, the box 22 is held in place by a mechanical locking system 52 that prevents the box 22 from moving in an upward direction to allow the feet 32*a* to unhook from the first plate portion 20*a*. The locking system 52 also locks the box 22 to the second plate portion 20*b*. In one example, the locking mechanism 52 is separate from the mounting foot plate attachment interface, such that attaching and locking/unlocking can be separately and independently performed. The locking mechanism 52 is movable between a locked position where the accessory box 22 is prevented from being removed from the base plate 20 and an unlocked position where the accessory box 22 is allowed to be removed from the base plate 20.

In one example, the locking mechanism 52 comprises a first lock feature 72 associated with the first plate portion 20*a* and a second lock feature 74 associated with the second plate portion 20*b*. The handle 100 is movable between a locked position and an unlocked position, wherein the handle 100 simultaneously unlocks the first lock feature 72 and the second lock feature 74 when moved to the unlocked position. In one example, there is a first latching aperture 76 (FIGS. 1A-B) provided in the first plate portion 20*a* and a second latching aperture 78 provided in the second plate portion 20*b*. The first lock feature 72 is received within the first latching aperture 76 when in a locked position and the second lock feature 74 is received within the second latching aperture 78 when in a locked position.

In one example, the first lock feature 72 comprises a first latch pin 80 that is coupled to the handle 100 via an actuating mechanism 82, and the second lock feature 74 comprises a second latch pin 84 that is fixed to the handle 100. As shown in FIG. 4, the handle 100 extends from a grip portion 102 at one end to a bottom or distal end 104. The second latch pin 84 is attached to the distal end 104 of the handle 100. In one example, the latch pin 84 is attached to the distal end 104 via a bracket and fastener assembly (not shown). Optionally, the second latch pin 84 could be formed as one piece with the handle 100. The second latch pin 84 is moved upwardly and out of the second latching aperture 78 when handle 100 is moved to the unlocked position.

Figure 5:
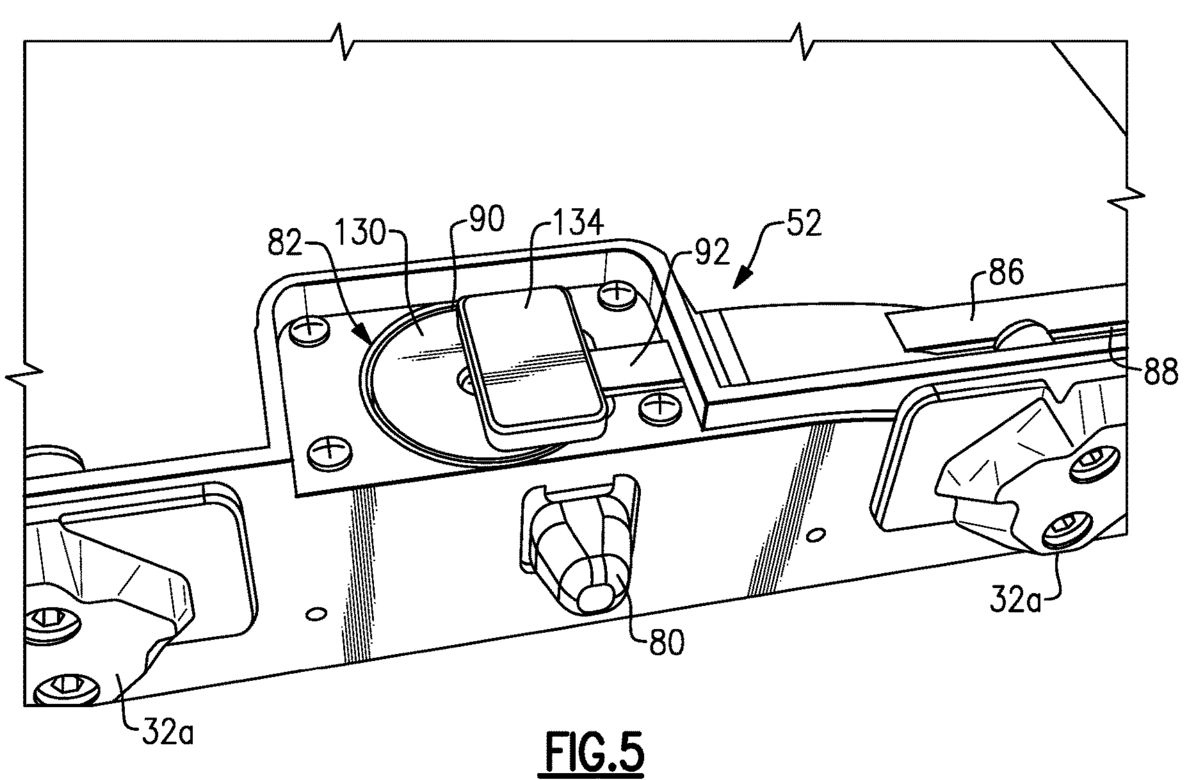
FIG. 5 is a top view of the first latch pin and associated actuating mechanism.
Figure 6:
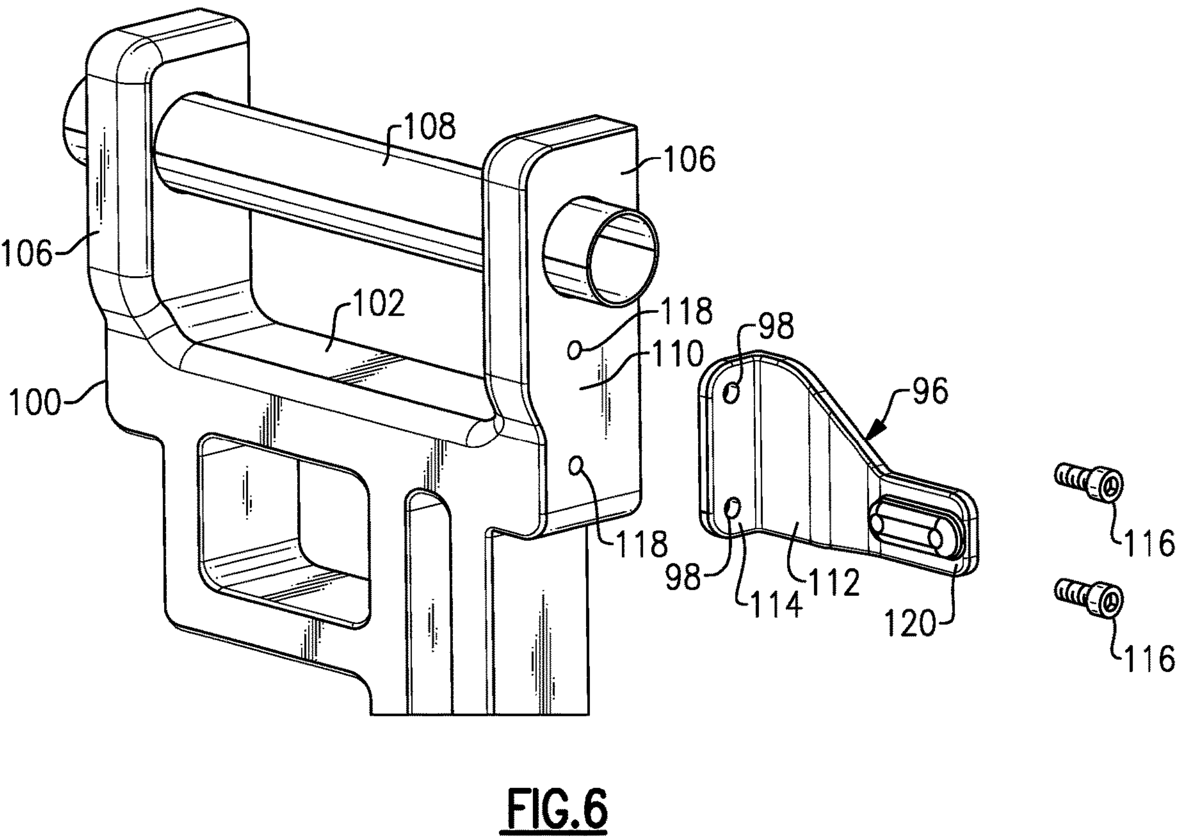
FIG. 6 is an exploded view of an upper portion of a handle from the accessory of FIG. 4.

The actuating mechanism 82 for the first latch pin 80 is shown in FIG. 5. In one example, the actuating mechanism 82 comprises an assembly that includes at least a strap 86 that is slidable along a channel or track 88 formed within a crossbar portion of the box 22 and a disk assembly 90 that is coupled to the strap 86. The strap 86 includes a first end 92 that is coupled to the disk assembly 90 and a second end 94 (FIG. 8) that is coupled to the handle 100 as shown in FIGS. 6-9. As shown in FIG. 6, a bracket 96 is used to attach the second end 94 of the strap 86 to the handle 100.

In one example, the handle 100 comprises an elongated body that extends from the grip portion 102 to the distal end 104. The grip portion 102 comprises a U-shaped portion with a pair of legs 106 that support a tube 108 that comprises a grip. Optionally, the tube 108 could be formed as one piece with the grip portion 102. In one example, one of the legs 106 includes a mount interface 110 to which the bracket 96 attaches.

Figure 7:
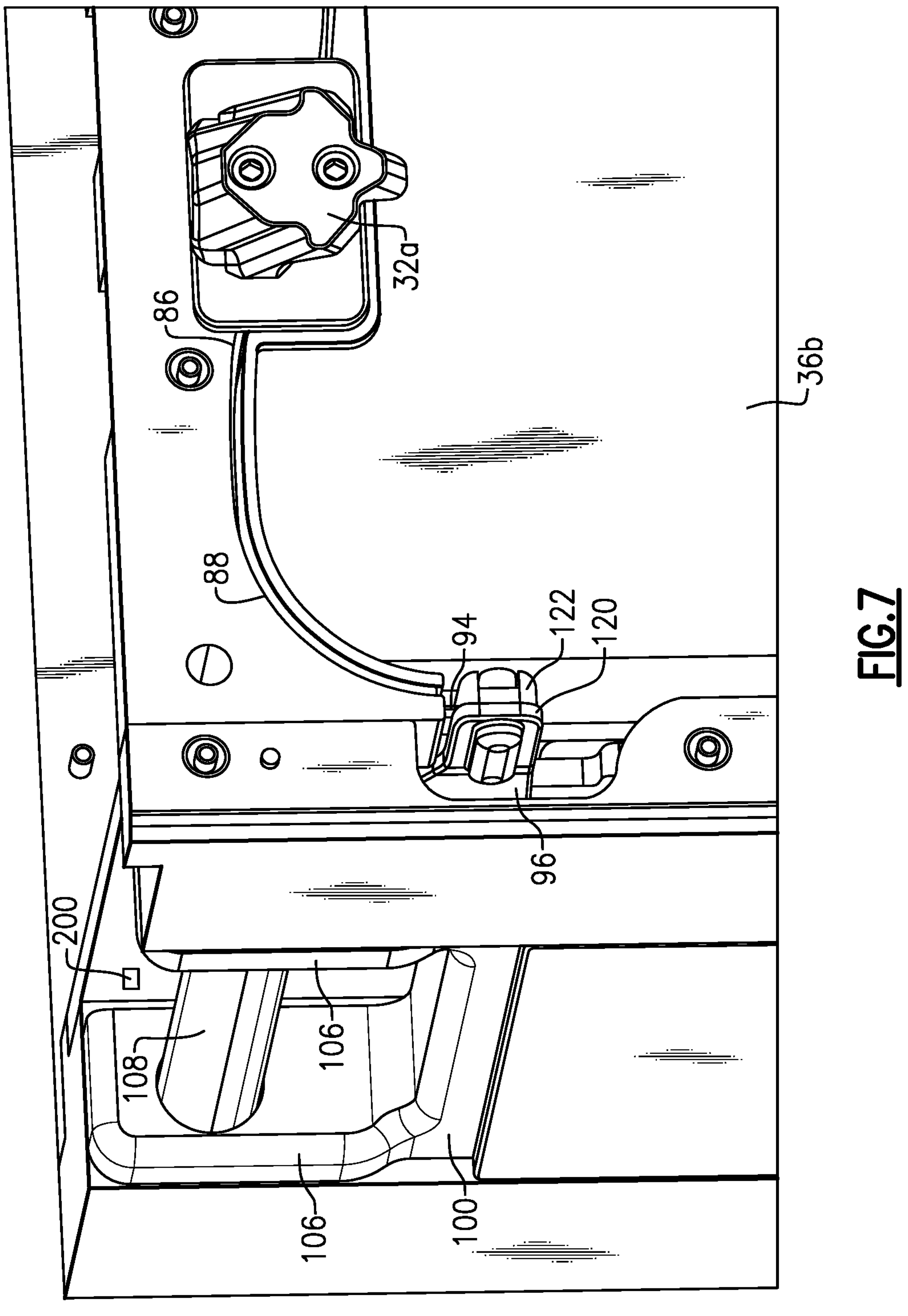
FIG. 7 is a perspective view of the handle of FIG. 6 as assembled.
Figure 8:
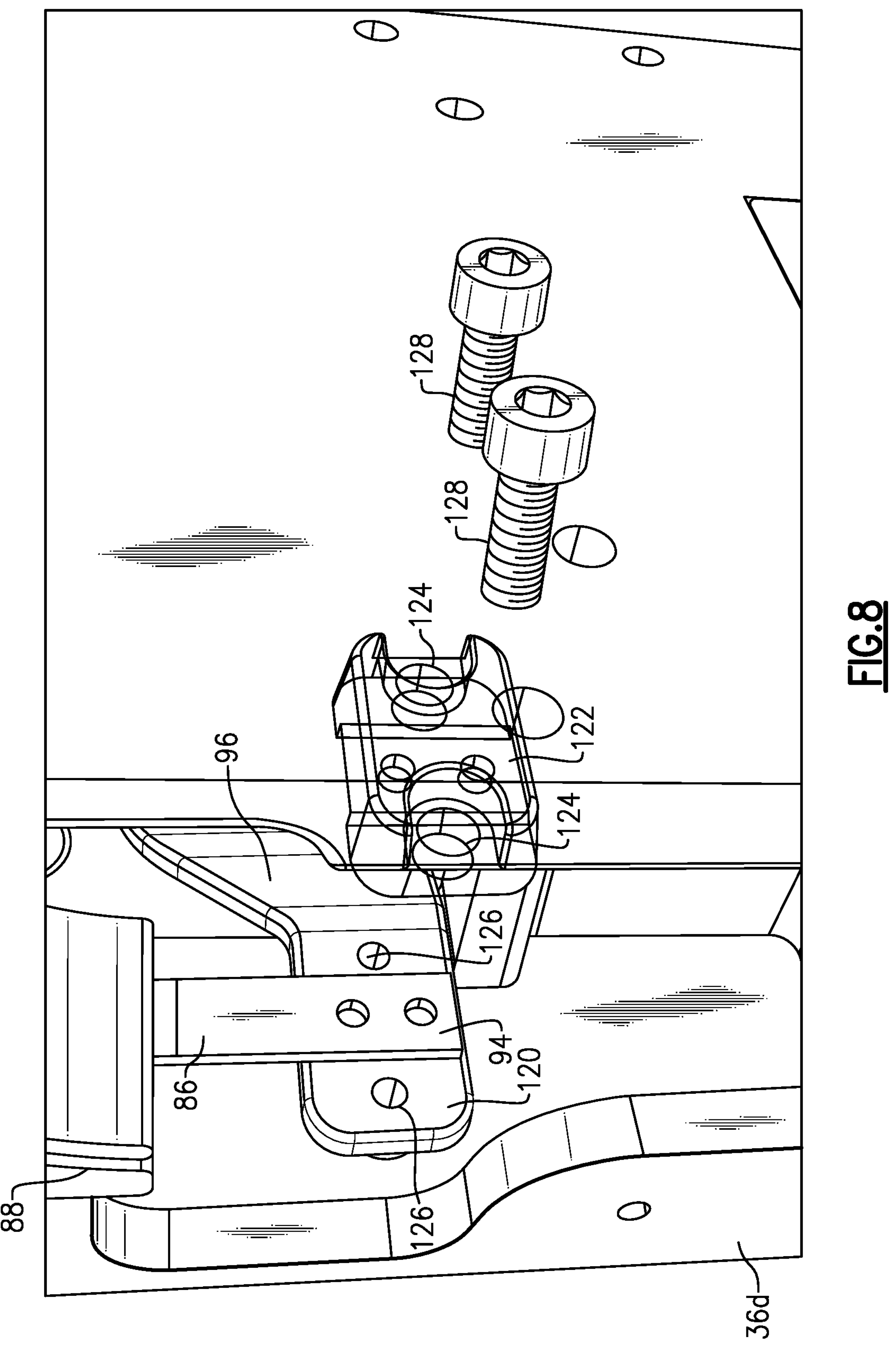
FIG. 8 is an exploded view of an attachment assembly used to attach a strap to the handle.

The bracket 96 comprises a flat body portion 112 with a transversely extending flange 114 at one end. The flange 114 is fit against the mount interface 110 on the handle 100 and is secured in place with fasteners 116, for example, that are received within openings 118 in the mount interface 110 that align with openings 98 in the flange 114. Other methods of attachment could also be used. In one example, the bracket 96 includes a mount interface at an end 120 opposite of the flange 114 that connects to the second end 94 of the strap 86 as shown in FIG. 8. In one example, a cover 122 is secured to the bracket end 120 over the strap 86 as shown in FIG. 7.

Figure 9:
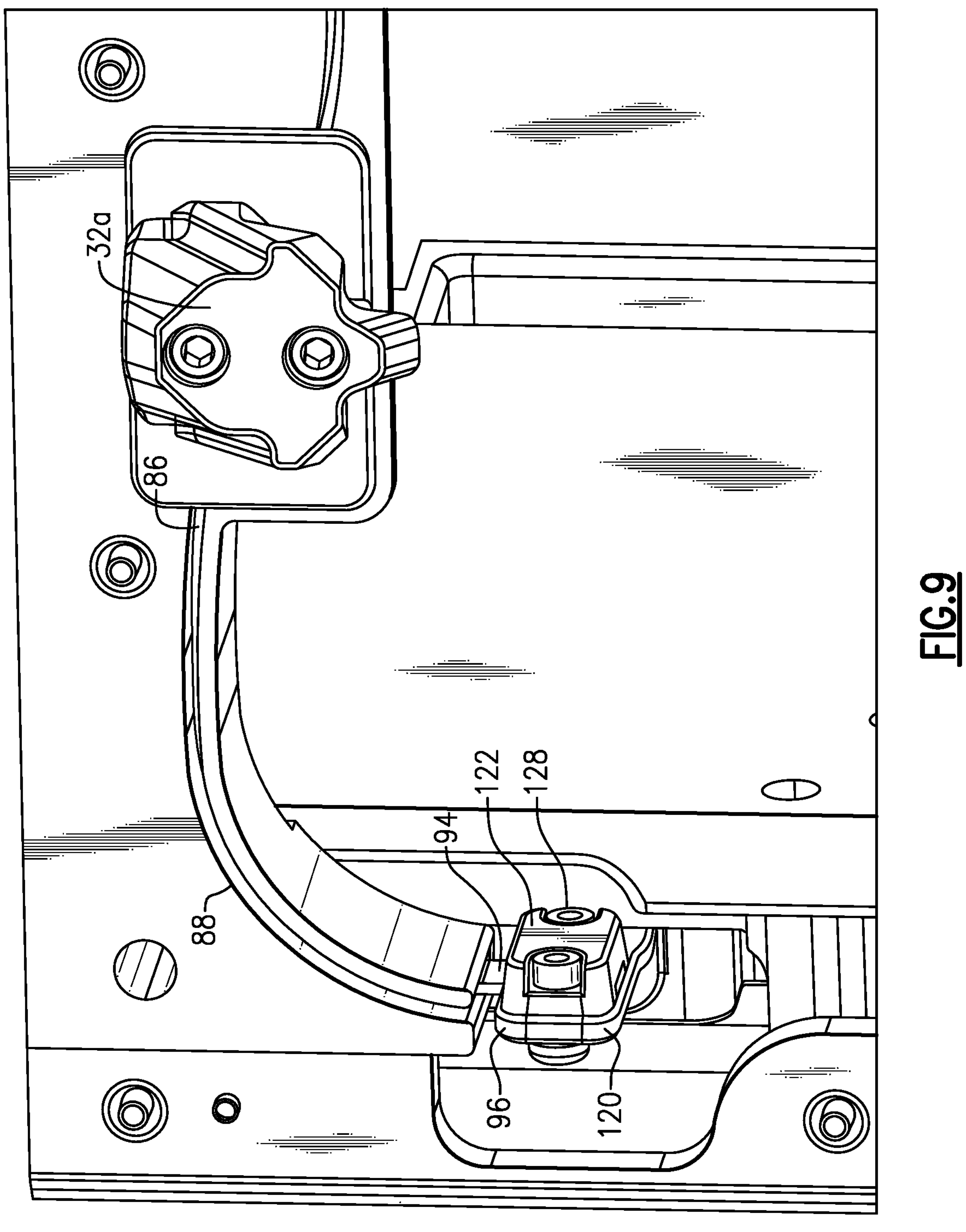
FIG. 9 is a side view of the handle, strap, and attachment assembly of FIG. 8 as assembled.

As shown in FIG. 8, the second end 94 of the strap 86 is sandwiched between the second end 120 of the bracket 96 and the cover 122. In one example, the cover 122 includes openings 124 that align with openings 126 in the second end 120 of the bracket 96. Fasteners 128 are inserted through the aligned openings 124, 126 to secure the cover 122 over the second end 94 of the strap 86 and attach to the bracket 96 as shown in FIG. 9. Other attachment methods could also be used.

Figure 10:
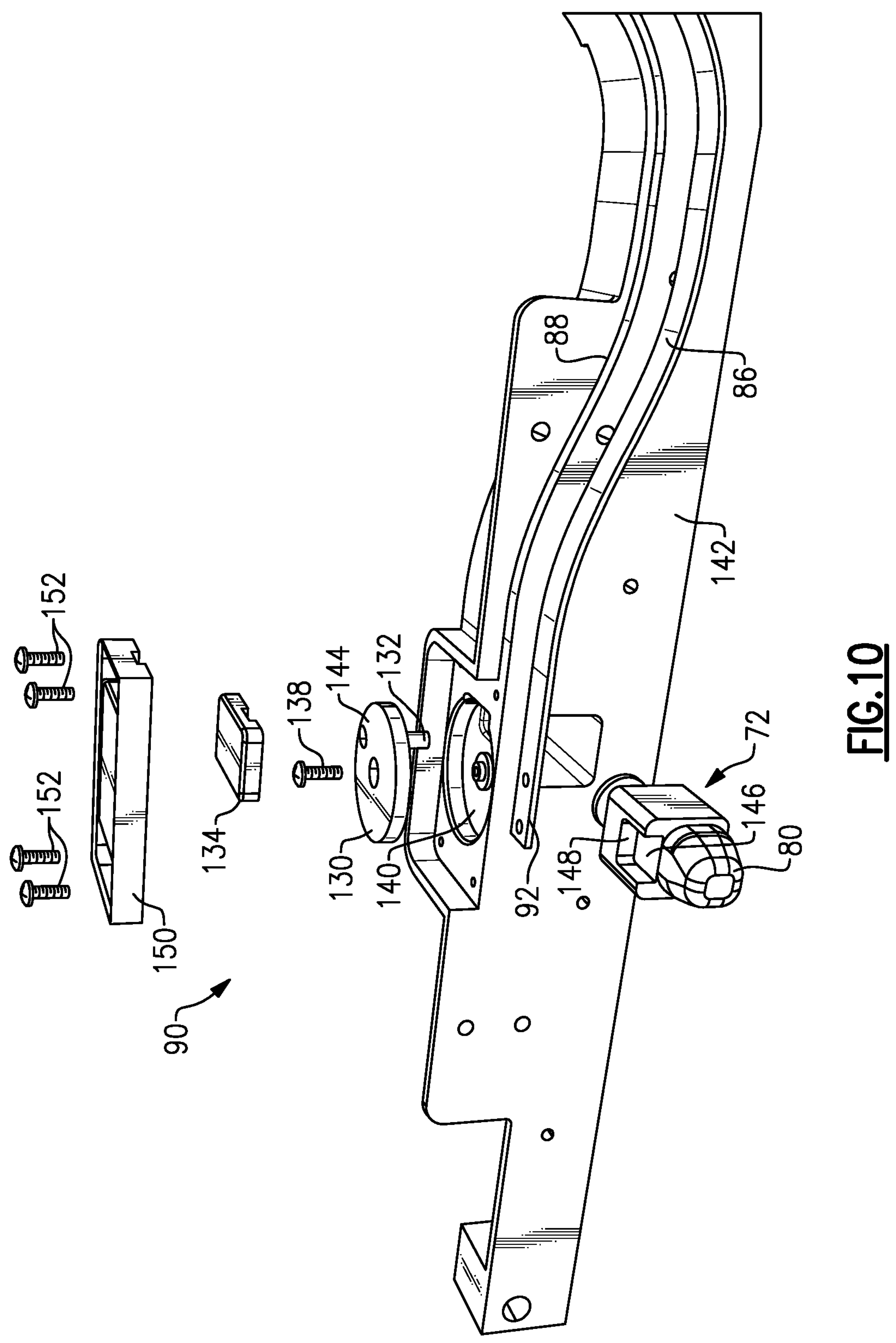
FIG. 10 is an exploded view of an actuating mechanism coupling the strap to the first latch pin.

FIG. 10 shows the disk assembly 90 in greater detail. As discussed above, the disk assembly 90 is attached to the first end 92 of the strap 86. In one example, the disk assembly 90 includes a disk 130 having a first pin 132 and a plate 134 with a second pin 136 (not visible in FIG. 10 but shown in FIG. 11). In one example, the plate 134 is fixed to the first end 92 of the strap 86 using fasteners, pins, adhesive, or other known methods of attachment. In one example, the disk 130 is fixed in place by a pin or fastener 138 within a recessed area 140 formed within a crossbar housing portion 142 that includes the track 88 for the strap 86. The housing portion 142 can be a separate piece that is mounted within the box 22, or can be integrally formed with the box 22. The disk 130 is mounted such that the disk 130 can be rotated between locked (FIG. 11) and unlocked (FIG. 12) positions. The second pin 136 of the plate 134 is received within an opening 144 formed in the disk 130. The first pin 132 is received within a recess 146 in the first latch pin 80. In one example, the first pin 132 abuts against a ledge or wall 148 that defines the recess 146.

Figure 11:
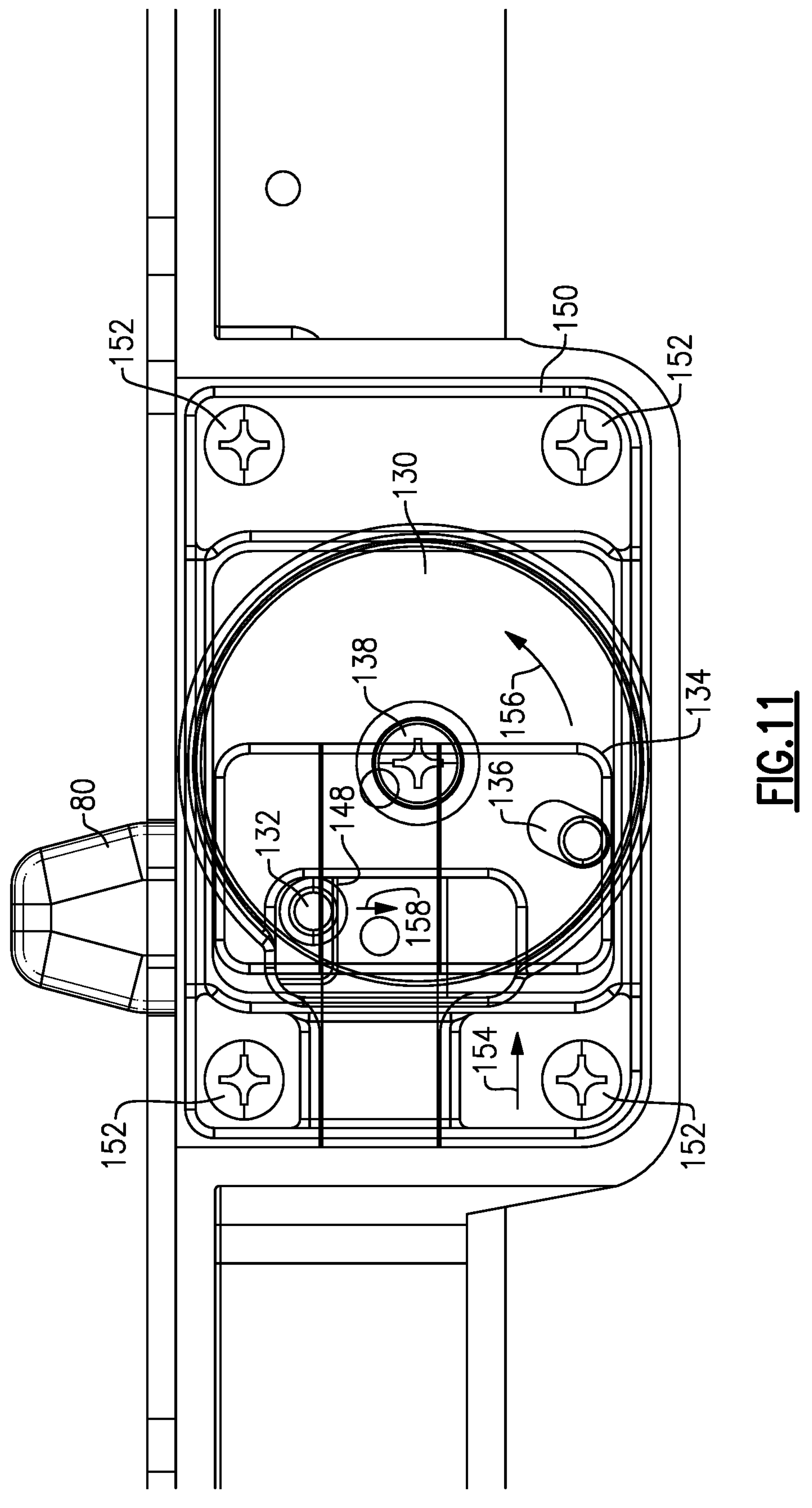
FIG. 11 is a top view of the actuating mechanism and the first latch pin in the locked position.
Figure 12:
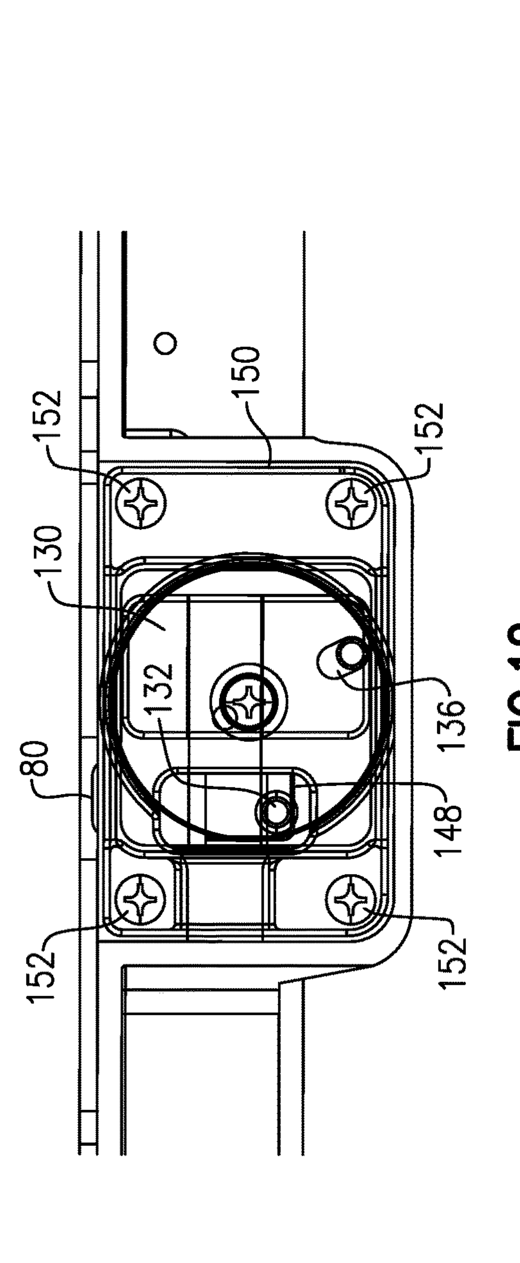
FIG. 12 is a top view of the actuating mechanism and the first latch pin in the unlocked position.

As shown in FIGS. 11-12, a cover 150 is installed with fasteners 152 to enclose the disk 130 and the plate 134 within the housing 142. The cover 150 can be used to prevent dirt and debris from interfering with the disc mechanism.

The locking system 52 operates as described below. When the handle 100 is moved to the unlocked position, the strap 86 is pushed along the track 88 and causes the disk 130 to rotate via the second pin 136. As the disk rotates 130, the first latch pin 80 is retracted from the locked position as shown in FIG. 11 to the unlocked position as shown in FIG. 12 via the first pin 132. The first pin 132 of the disk 130 retracts the first latch pin 80 from the first latching aperture 76 by reacting against the wall 148 of the recess 146 in the first latch pin 80. A resilient member or biasing member (not shown) can be used to return the first latch pin to a locked position once the handle 100 is returned to the locked position.

As shown in FIG. 11, the strap 86 pushes the plate 134 along a linear path in a first direction, as indicated by arrow 154, which causes the second pin 136 to rotate the disk 130 as indicated by arrow 156. Rotation of the disk 130 drives the first pin 132 against the wall 148 of the latch pin 80 and causes the latch pin 80 to retract along a linear path in a second direction as indicated by arrow 158.

Figure 13:
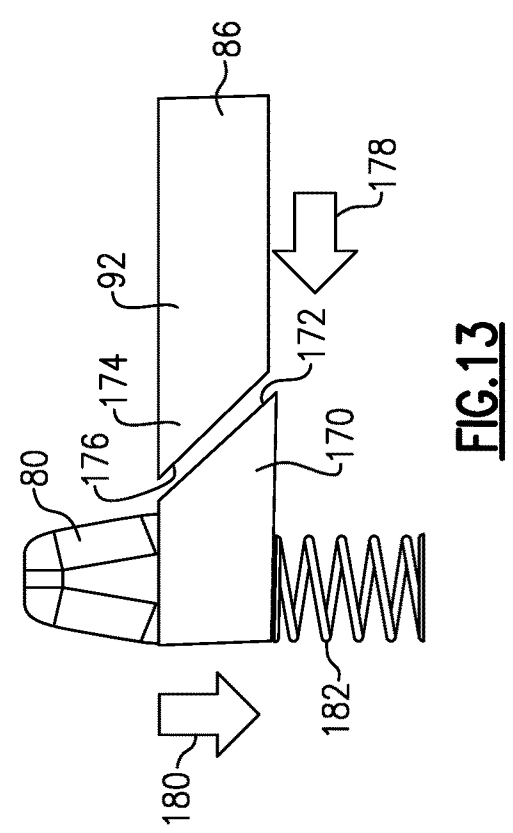
FIG. 13 is a schematic view of an alternate actuating mechanism for the first latch pin.

FIG. 13 shows another example of how to retract the latch pin 80. In this example, the latch pin 80 includes a first wedge portion 170 with a first wedge surface 172. The second end 92 of the strap 86 includes a second wedge portion 174 with a second wedge surface 176. The strap 86 pushes the second wedge surface 176 against the first wedge surface 172 in a direction as indicated by arrow 178, which causes the latch pin 80 to retract in a direction as indicated by arrow 180. A resilient member 182 can return the latch pin 80 to the extended and locked position.

Figure 14:
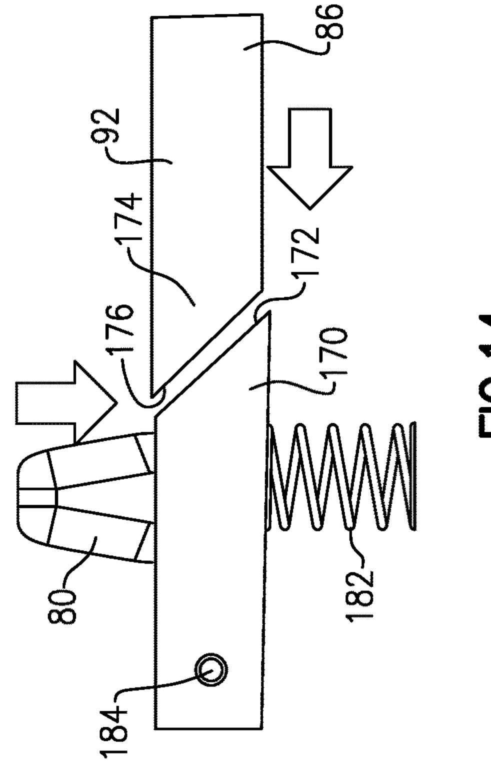
FIG. 14 is a schematic view of an alternate actuating mechanism for the first latch pin.

FIG. 14 shows another example of how to retract the latch pin 80. This example is similar to that of FIG. 13, but the engagement of the wedge surfaces 172, 176 causes the latch pin to rotate about an axis as indicated at 184.

In one example, at least one light feature 200 is associated with one of the walls of the box 22 to indicate an accessory characteristic. For example, the light feature 200 is associated with the side wall **36*d* that includes the handle 100 and is used to indicate a locking state of the box. In one example, the light feature 200 comprises a LED that is located near an upper end of the side wall 36*d*. The LED can be powered via connection to the vehicle power source, and when the box 22 is attached to the base plate 20 and the handle 100 is in the locked position, the LED is on to indicate that the box 22 is locked to the base plate 20. When the handle 100 is moved to the unlocked position, the handle 100 overlaps and covers the LED to indicate a change in a locking state. In one example, the handle 100 is molded out of a semi-transparent plastic material and the handle 100** will glow indicating the unlatched state.

The subject disclosure provides a single handle mechanism that simultaneously actuates both a bottom latch pin 84 and a rear latch pin 80. The track 88 for the strap 86 can be molded into a back side of box to provide a smooth path for movement of the strap between locked and unlocked positions. To achieve a low friction path for the strap 86, the molding for this part can comprise compression molded PTFE, for example. Alternative materials could include PEEK, PPS or nylon materials. The circular disk and pin assembly 90 smoothly pulls the rear latch pin 80 back when the strap 86 pushes against the pin. Lubricant can be placed in the mechanism to ensure smooth operation, such as a silicone dry film, for example. In one example, the rear latch pin 80 is molded in a PEEK material, which the strength is further enhanced through the addition of carbon fiber or chopped glass.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:

a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface;

an accessory comprising at least one accessory side wall including at least one first lock feature associated with the first plate portion, and a bottom wall including at least one second lock feature associated with the second plate portion; and wherein the accessory includes at least one handle that is movable between a locked position and an unlocked position, and wherein the at least one handle simultaneously unlocks the at least one first lock feature and the at least one second lock feature when moved to the unlocked position.

2. The accessory attachment system of claim 1, including at least one first aperture provided in the first plate portion and at least one second aperture provided in the second plate portion, and wherein the at least one first lock feature is received within the at least one first aperture when in the locked position and wherein the at least one second lock feature is received within the at least one second aperture when in the locked position.

3. The accessory attachment system of claim 2, wherein the at least one first lock feature comprises a first latch pin that is coupled to the at least one handle via an actuating mechanism and the at least one second lock feature comprises a second latch pin that is fixed to the at least one handle.

4. The accessory attachment system of claim 3, wherein the actuating mechanism comprises a strap that is slidable along a track to retract the first latch pin from the at least one first aperture when the at least one handle is moved to the unlocked position.

5. The accessory attachment system of claim 3, wherein the at least one handle extends from a grip portion to a distal end, and wherein the second latch pin is attached to the distal end of the at least one handle, and wherein the second latch pin is moved upwardly and out of the at least one second aperture when the at least one handle is moved to the unlocked position.

6. The accessory attachment system of claim 1, wherein the at least one accessory side wall comprises a rear wall and wherein the accessory further includes a pair of side walls that extend upwardly from the bottom wall and which connect the rear wall to a front wall, and wherein the at least one handle is supported by one side wall of the pair of side walls for sliding movement between the locked position and the unlocked position.

7. The accessory attachment system of claim 6, including at least one light feature associated with one of the front wall, rear wall, and pair of side walls to indicate an accessory characteristic.

8. The accessory attachment system of claim 7, wherein the at least one light feature is associated with the one side wall, and the accessory characteristic is a locking state indicator, and wherein when the at least one handle is moved to the unlocked position, the at least one handle overlaps the at least one light feature indicating a change in a locking state.

9. The accessory attachment system of claim 1, wherein the at least one first lock feature comprises a latch pin and a strap assembly, wherein the latch pin is insertable into a latching aperture in the first plate portion, and wherein the strap assembly couples the latch pin to the at least one handle such that movement of the at least one handle is translated into movement of the latch pin.

10. The accessory attachment system of claim 9, wherein the strap assembly includes a strap, a disk having at least a first pin, and a plate with a second pin, wherein the plate is fixed to a first end of the strap and the first pin is in engagement with the latch pin, and wherein the second pin is received within an aperture in the disk, and when the at least one handle is moved to the unlocked position, the strap rotates the disk via the second pin, which in turn retracts the latch pin from the latching aperture via the first pin.

11. The accessory attachment system of claim 10, wherein the strap includes a second end that is fixed to the at least one handle via at least one mounting bracket.

12. The accessory attachment system of claim 1, wherein:

the first plate portion and the second plate portion each include a plurality of mounting apertures;

the accessory includes one or more cleats or mounting feet that are receivable within the plurality of mounting apertures; and the first lock feature and the second lock feature are independent of the one or more cleats or mounting feet.

13. The accessory attachment system of claim 12, wherein:

the first plate portion and the second plate portion each include a plurality of latching apertures that are different from the plurality of mounting apertures; and the first lock feature and the second lock feature are associated with the plurality of latching apertures.

14. The accessory attachment system of claim 13, wherein:

the first plate portion and the second plate portion each include a plurality of plate power interfaces that are different from the plurality of mounting apertures and the plurality of latching apertures; and each plate power interface is configured to provide power to the accessory.

15. An accessory attachment system, comprising:

a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface;

wherein the first plate portion and the second plate portion include a plurality of apertures, wherein at least one of the plurality of apertures comprises a first latching aperture located in the first plate portion and at least another of the plurality of apertures comprises a second latching aperture located in the second plate portion;

an accessory comprising at least one accessory side wall including at least one first lock feature associated with the first latching aperture and a bottom wall including at least one second lock feature associated with the second latching aperture; and wherein the accessory includes at least one handle that is movable between a locked position and an unlocked position, and wherein the at least one handle simultaneously unlocks the at least one first lock feature and the at least one second lock feature when moved to the unlocked position.

16. The accessory attachment system of claim 15, wherein the at least one accessory side wall includes at least one cleat and the plurality of apertures includes at least one cleat aperture that receives the at least one cleat to attach the accessory to the first plate portion, and wherein the at least one cleat aperture is distanced from the first latching aperture.

17. The accessory attachment system of claim 16, wherein the at least one cleat aperture comprises a plurality of cleat apertures that are different than the first latching aperture and the second latching aperture, and wherein the plurality of apertures further comprise a plurality of plate power interfaces that are different from the plurality of cleat apertures and the first and the second latching apertures.

18. The accessory attachment system of claim 15, wherein the at least one first lock feature comprises a first latch pin that is coupled to the at least one handle via an actuating mechanism and the at least one second lock feature comprises a second latch pin that is attached to the at least one handle.

19. The accessory attachment system of claim 18, wherein the actuating mechanism comprises a strap assembly that couples the first latch pin to the at least one handle such that movement of the at least one handle is translated into movement of the first latch pin, and wherein the strap assembly includes a strap, a disk having a first pin, and a plate having a second pin, wherein the plate is fixed to a first end of the strap and the first pin is in engagement with the first latch pin, and wherein the second pin is received within an aperture in the disk, and when the at least one handle is moved to the unlocked position, the strap rotates the disk via the second pin, which in turn retracts the first latch pin from the first latching aperture via the first pin.

20. The accessory attachment system of claim 18, wherein the at least one handle extends from a grip portion to a distal end, and wherein the second latch pin is attached to the distal end of the at least one handle, and wherein the second latch pin is moved upwardly and out of the second latching aperture when the at least one handle is moved to the unlocked position.

21. The accessory attachment system of claim 15, wherein the at least one accessory side wall comprises a rear wall and wherein the accessory further includes a pair of side walls that extend upwardly from the bottom wall and which connect the rear wall to a front wall, and wherein the at least one handle is supported by one side wall of the pair of side walls for sliding movement between the locked position and the unlocked position, and including at least one light feature that is associated with the one side wall of the pair of side walls, and wherein when the at least one handle is moved to the unlocked position, the at least one handle overlaps the at least one light feature indicating a change in a locking status.

22. A method of attaching an accessory to a base plate configured to be positioned within a vehicle cargo area that has a floor surface and at least one side wall extending upwardly relative to the floor surface, and wherein the base plate includes at least a first plate portion that is associated with the at least one side wall and a second plate portion that extends above the floor surface, and wherein the accessory includes at least a first lock feature and a second lock feature, the method including:

simultaneously unlocking the first lock feature from the first plate portion and the second lock feature from the second plate portion when at least one handle associated with the accessory is moved to an unlocked position.

23. The method of claim 22, wherein the first lock feature comprises a first latch pin and the second lock feature comprises a second latch pin, the method including providing at least one first latching aperture in the first plate portion to receive the first latch pin and at least one second latching aperture in the second plate portion to receive the second latch pin, coupling the first latch pin to the at least one handle via a strap assembly, fixing the second latch pin to a bottom end of the at least one handle, and simultaneously pulling the first latch pin out of the at least one first latching aperture via the strap assembly and pulling the second latch pin out of the at least one second latching aperture via the at least one handle.

24. The method of claim 22, including using a light feature associated with the accessory to indicate a change in locking status of the accessory.

25. The method of claim 22, including:

forming a plurality of mounting apertures in each of the first plate portion and the second plate portion;

providing one or more cleats or mounting feet on the accessory that are receivable within the plurality of mounting apertures; and forming the first lock feature and the second lock feature to be independent of the one or more cleats or mounting feet.

26. The method of claim 25, including:

forming a plurality of latching apertures that are different from the plurality of mounting apertures in each of the first plate portion and the second plate portion; and associating the first lock feature and the second lock feature with the plurality of latching apertures.

27. The method of claim 26, including:

forming a plurality of plate power interfaces that are different from the plurality of mounting apertures and the plurality of latching apertures in each of the first plate portion and the second plate portion; and powering the accessory via at least one of the plurality of plate power interfaces.

* * * * *